United States Patent Office 2,921,853
Patented Jan. 19, 1960

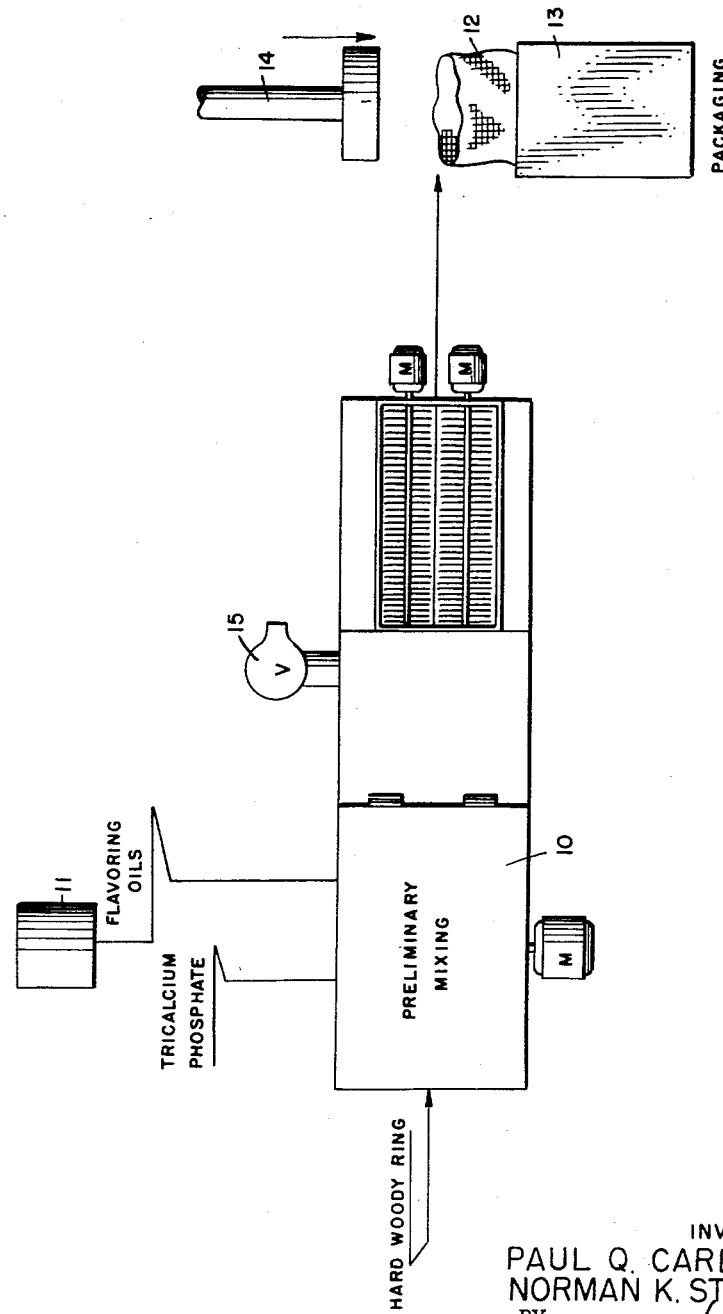

2,921,853

FLAVOR PREMIX FOR ANIMAL FEEDS

Paul Q. Card, Deerfield, and Norman K. Stanton, Palatine, Ill., assignors to The Northern Trust Company, as trustee, Chicago, Ill.

Application March 4, 1957, Serial No. 643,807

17 Claims. (Cl. 99—2)

This invention relates to a flavoring product for animal feeds, and more particularly to a concentrated flavor premix and to a method of processing the same which is adapted for use in animal feeds.

It is common to mix flavoring materials with animal feeds to make such feeds more tempting and palatable. Quite often, the flavoring materials are provided in the form of a premix which is dispersed throughout the animal feed by any of a number of ordinary mixing techniques. In the main, such flavor premixes comprise a carrier and the flavoring itself, and generally the carriers employed are soy grits, corn sugars and similar products.

As is well known, a flavoring material to be effective must be provided in a certain quantity or intensity per volume of the feed. One of the primary difficulties with the flavor premixes now available is that the flavoring itself in the premix bulk constitutes a very small percentage thereof —6% to 8%. As a consequence, it is necessary to use relatively large volumes of such premixes in order to obtain the requisite intensity dispersion of the flavoring in the animal feed. This is a disadvantage in that it entails a considerable expense in the purchase of the premix, it necessitates substantial time to blend the large quantity of premix into the animal feed, and it provides considerable bulk which the animal must consume and which often has little or no nutritive value.

Another disadvantage inherent in the known flavor premixes is that they are hydrophylic and deteriorate quickly as a result thereof when exposed to relatively high humidity. This also is a disadvantage in packaging the premix materials in that considerable care must be taken to avoid compression or packing thereof in containers for such compression results in a caking or integration of the mass, whereby it is not readily dispersible through the animal feed. Moreover, such premixes are sensitive to temperature and tend to crystallize when cold, and when subjected to relatively high temperatures the flavoring itself forms liquid globules that separate from the carrier.

It is apparent that a need exists for an improved flavor premix for animal feeds, and the provision of such a premix is one of the objects of this invention. Another object of the invention is that of providing a flavoring material adapted for admixture with an animal feed, which has the advantages among others of overcoming the objectionable features of heretofore known premixes as set forth above. Still another object is to provide a flavor premix comprising a flavoring liquid and a carrier therefor, in which the liquid flavoring constitutes a high percentage of the mass—for example, from 45% to 50% thereof, although preferably in commercial form from 25% to 35%.

A further object is in providing a flavor premix as described, wherein the carrier is finely comminuted and is of a high absorbency cellulose material of a hard woody lattice structure capable of absorbing through capillary action a high concentration of liquid flavoring and maintaining its form under further handling without hard packing, and characterized by exposing a tremendous surface area of the flavoring whereby substantially less premix is necessary for admixture with a given quantity of the animal feed. Still a further object is in the provision of a flavor product as described, wherein the hardest part of corn cobs generally referred to as the hard woody ring is used as the carrier; and because of the high concentration of the flavoring that is afforded by the hard woody ring, the particle size of the carrier (that is, the hard woody ring or "woody ring") may be greatly reduced with the result that a much greater and more uniform dispersion of the premix is afforded throughout an animal feed with which it is used. Woody ring is referred to in Pat. No. 2,733,145 as the least absorbent material of the corn cob.

It has also been found that the irregular character of woody ring particles has the advantage of maintaining the premix in uniform dispersion throughout an animal feed, and it is therefore an additional object of the invention to provide a premix that has considerably less tendency to separate from an animal feed upon agitation thereof. Yet another object is that of providing a flavor product of the character described, that remains fluffy throughout a wide temperature range (for example, at least from —20° to plus 180° F.), and in which the method of processing the same includes the step of compressing a large volume thereof into containers for compact shipment and storage, yet the product does not cake and remains fluffy. Additional objects and advantages of the invention will become apparent as the specification develops.

As an aid in the further description of the invention, a diagrammatic showing in the form of a flow sheet of the processing of the premix is illustrated in the single figure of the accompanying drawing.

We have discovered that hard woody ring which is a complex cellulose having a lattice or open basketwork construction, has a high capillary absorbency capable of absorbing up to 45%, and in many instances 50%, by weight of flavoring oils and to hold such oils through a wide range of temperatures without the oils forming liquid globules in the open passages of the latticework. This discovery has enabled us to provide a flavor premix for animal feeds having the tremendous advantages such as described hereinbefore over flavor premixes now in use.

The woody ring is obtained from corn cobs, and it represents about one structural part in about four to five parts of the corn cob by weight. This woody ring cellulose is an accepted form of animal feed since it is non-toxic and substantially inert with respect to allergies of animals. Ordinarily, the woody ring itself adds little or no nutritional value to the feed percentagewise of its use. However, in the bovine animal, it may have some added nutritional value through the bacterial action that takes place therein.

In preparing a premix employing hard woody ring as a carrier, it is the dust separation of the corn cob grinding process that is used which was formerly considered to be waste. The hard woody ring is added in a suitable quantity to a mixer 10 which may be a horizontal ribbon mixer having a sifter at one end thereof. While the precise quantity of hard woody ring placed in the mixer is not critical, we have found that quantities in the order of about 200 pounds will comprise a convenient batch size. When added to the mixer, the hard woody ring preferably has a moisture content of less than 6% and it constitutes a mixture of two or more different particle sizes, ranging from 50 to 80-mesh but preferably 50 and 80-mesh. These two different particle sizes are employed, for in admixture they give a reddish or brown cast to the product after mixing which is commercially advantageous and thereafter there is very little color change with ageing. Further, however, the 50 and 80-mesh particles afford a more compact end product in that the smaller particles interlace the larger ones.

Next, we prefer to mix a desiccant with the readied woody ring to further lower the moisture content thereof, and tricalciumphosphate has been found to be satisfactory. It may be noted that it is not essential that the tricalciumphosphate be first added to the woody ring, but it may be added at a later stage in the process.

The mixer is next energized, and the flavoring oil or oils are added slowly to the agitated woody ring and are therefore preliminarily mixed therewith. The flavoring oils are added in sufficient quantity so as to provide the desired proportion thereof to the woody ring. While the woody ring will absorb up to from 45 to 50% by weight of flavoring oils, it is preferable to mix in a somewhat smaller proportion of flavoring as, for example, from 25 to 35%. The reason for this is that such a smaller percentage affords a considerable safety margin in that if the premix product is exposed to extremely high temperatures (as, for example, up to and above 180° F.), there still will be no danger of the liquid flavoring separating from the woody ring carrier.

One or more liquid flavoring materials may be added to the woody ring. For convenience, the following exemplifications are set forth:

Classification of flavor

| | |
|---|---|
| Essential oils | Oil cinnamon, oil clove, oil caraway, oil orange. |
| Terpeneless oils | Oil bay, oil dill, oil ginger, oil lemon, oil limes, oil peppermint, oil spearmint, oil anise. |
| Infused oils | Asafoetida, burdock, henbane, vanillas. |
| Oleoresins | Black pepper, ginger, turmeric, celery, cubeb, mace, paprika. |
| Solid extracts | Fenugreek, lovage, styrax, tolu. |
| Aromatic chemicals | Alcohols, aldehydes, esters, ketones, acetates, etc. |
| Balsams | Peru, tolu, fir styrax. |
| Powdered extracts | Licorice, anise, lovage. |
| Animal derivatives | Musk, civet, ambergris, castoreum, marine animal oils, animal fats. |
| Powdered dry spices | Nutmeg, cinnamon, clove, mace, pepper, thyme. |
| Perfume oils | Apple, carnation, cologne, gardenia, honeysuckle, rose. |
| Fixed oils | Peanut, corn, soy, linseed, palm, cocoanut, olive, skunk, turtle. |
| Solvents | Propylene glycol, grain alcohol, vegetable derivatives. |
| Emulsifying agents | Arabic, vegetable derivatives, gelatin, Irish moss, tragacanth. |
| Fractionated vegetable agents | Caprylic, caproic, acetic, acid, butyric, etc. |
| Tinctures | Gum benzoin, tonquin musk, orris root. |
| Miscellaneous | Menthol, waxes, spermaceti, blended imitation flavors, mineral oil, food colors, drying agents. |

We prefer to employ a mixture of various oils taken from the above classification, and in this case the oils are first mixed together as in a mixer 11. A proportion of about five to seven and one-half gallons of oil to a 200-pound batch of woody ring will afford the desired 25% of liquid flavoring to the woody ring, and such a quantity of flavoring liquid may be slowly added to the mixer 10 in a period of about five minutes.

Mixing is continued at room temperature—that is, from about 50° to 85° F.—for a period of about 15 to 20 minutes. The precise length of time will be determined by the workman from the texture of the mixed material. That is, by texture is meant uniformity of color, and when the color of the entire batch is uniform, the mixing is complete.

It has been found that the mixing time will vary with the viscosity of the liquid flavoring, and with a higher viscosity a greater mixing time is necessary. We have discovered that an elevation in temperature occurs during the mixing which must be considered in establishing the mixing time. Further, the mixing appears to have the effect of tearing the liquid apart to get it dispersed into the woody ring. When a more viscous liquid flavoring is used, a longer mixing time is required to bring about this effect, and also to elevate the temperature during the mixing which often rises by as much as 10° to 15° F. It is believed that this temperature rise and the tearing action on the liquid are generally coextensive; and it has been found that the greater the viscosity of the liquid, the more rapid is the temperature rise in the mixing thereof, but the mixing time for a more viscous liquid is not proportionately increased because mixing time is reduced correspondingly by a temperature rise and as stated, the temperature rise in mixing is more rapid with a viscous material.

After the mixing has been carried to completion, the premix is fed into a flexible bag or container 12 such as a polyethylene bag, which is employed because it is essentially moisture-resistant and therefore will have the effect of protecting the premix from rain. There is little need, however, to protect the premix from simple high humidity because it exhibits substantially no tendency to absorb moisture. It may also be noted that any residual moisture in the woody ring during the mixing thereof may be displaced by the oil flavoring for it has the tendency to drive off moisture from the woody ring carrier.

The bag 12 is placed within a container 13 which may be a fiber drum, and thereafter a press or plunger 14 is pushed downwardly against the filled bag 12 to compress it into the smaller container 13. Ordinarily, the premix material is compressed by about 20% of its volume to force it into the smaller container 13. This has the advantage of requiring less space for storage and shipment, etc., but as heretofore brought out, it does not have the effect of caking the premix. Rather, the premix remains fluffy and can be scooped readily in its particulate form from the bag 12.

In certain instances, it may be desirable to increase the percentage of flavoring liquid in the woody ring carrier above the 45 to 50% proportions heretofore stated. An example of this would be in making tritruate tablets. Such tablets have a pharmaceutical use and constitute a carrier combined with trace drug products that may have a slight flavor added thereto. It is desirable to have tablets of this character with the least amount of carrier. Increasing the liquid concentration in the woody ring carrier may be provided by applying a vacuum to the material during the mixing thereof, such as through a vacuum pump 15 connected to the mixer 10.

From the foregoing description it will be apparent that the premix of this invention represents a tremendous advance over those heretofore available. In no other known flavor carrier is it possible to obtain the high flavoring concentrations afforded by woody ring, which enables us to provide a premix having well upwards of four to five times the potency or intensity of the prior products. Consequently, less of our premix is required for flavoring a given quantity of animal feed; and because of the high concentration, small particles may be employed whereby a greater and more uniform dispersion is obtained of the premix in an animal feed. Also, the dispersed premix does not have the tendency of separating from the feed when it is agitated, and the premix may be stored for long periods without deterioration for it is characterized by having a long aroma life and does not readily absorb moisture.

Moreover, it can be conveniently packaged in relatively small containers for it is compressible, yet upon opening the container, immediately regains its fluffiness and such fluffiness is unaffected by wide temperature variations. Because of the capillary absorption of the flavoring oils in the structure of the woody ring itself which holds the oils under relatively large surface tension, the liquid flavoring is held in high concentration while tremendous surface areas thereof are exposed, which yields a high aroma intensity.

The advantage of particle size afforded by the premix is made evident when compared to a common base now in use, namely soy grits; and in comparison therewith our premix has at least from four to eight times as many particles for a given weight. The premix may be used with any suitable animal feed, whether a mineral or protein feed, and may be mixed therewith at low temperatures without balling or crystallization. It may be stored in extremely cold places without the danger of freezing, and since the liquid is held in suspension by the woody ring carrier, it is not necessary that the shipping and storage containers be liquid-tight.

While in the foregoing specification an embodiment of the invention has been described in considerable detail for purposes of illustration, it will be readily apparent to those skilled in the art that numerous changes may be made in those details without departing from the spirit and principles of the invention.

We claim:

1. A premix for animal feeds, consisting essentially of woody ring and a liquid flavoring in absorptive admixture therewith, the proportion of the liquid flavoring to the woody ring being less than about 50% by weight.

2. A premix of the character described adapted for use in the flavoring of animal feds, consisting essentially of woody ring carrier having a lattice structure of high capillary absorbency, and a liquid flavoring in absorptive admixture with said carrier, the quantity of the liquid flavoring in admixture with the carrier being less than the capillary saturation of the carrier whereby such liquid flavoring is held under surface tension by the carrier.

3. The premix of claim 2 in which said woody ring carrier comprises a mixture of both larger and smaller woody ring particles.

4. A premix according to claim 3 in which certain of said woody ring particles are about 80-mesh and others about 50-mesh.

5. A premix according to claim 2 in which the proportions of said liquid flavoring are in the range of up to about 45 to 50% by weight.

6. The premix of claim 2 in which the proportions of said liquid flavoring are within the range of about 25 to 35% by weight.

7. A concentrated flavor premix for use in the flavoring of animal feeds, consisting essentially of a mixture of larger and smaller woody ring particles to define a relatively fine-grain carrier, said woody ring particles being characterized by having a lattice structure and high absorbency, and a liquid flavoring, said flavoring being absorbed by said woody ring and held in capillary suspension thereby, the proportions of said liquid flavoring by weight in suspension in the woody ring being within the range of about 20 to 45%.

8. The premix of claim 7 in which said particles have an irregular configuration whereby when dispersed throughout an animal feed, they resist separation therefrom on agitation of the feed.

9. The premix of claim 8 in which said particles are about 50 and 80-mesh.

10. The premix product of claim 7 in which said liquid flavoring comprises at least one oil base flavor.

11. The flavor premix of claim 7 in which said flavoring comprises at least one material taken from the class consisting of essential oils, terpeneless oils, infused oils, oleoresins, solid extracts, aromatic chemicals, balsams, powdered extracts, animal derivatives, powdered dry spices, perfume oils, fixed oils, solvents, emulsifying agents, fractionated vegetable agents and tinctures.

12. A flavor premix package, comprising a container adapted to receive a material therein under compression, and a flavor premix product consisting essentially of woody ring particles and a liquid flavoring in admixture therewith within said container, said premix product being compressed within said container to within about 80% of its normal volume and being characterized by maintaining a fluffy, particulate condition.

13. The package of claim 12 in which said premix product contains a liquid flavoring in the proportions of about 20 to 35% by weight of the woody ring, said premix product being characterized by the maintenance of said liquid flavoring in capillary suspension within said woody ring particles while compressed within said container.

14. In a method of processing a concentrated flavor premix adapted for use in animal feeds, the steps of agitating a carrier in granular form consisting essentially of woody ring, adding a liquid flavoring to the agitated woody ring, continuing the agitation of the woody ring to obtain a temperature rise of about 10° F. and a thorough capillary absorption of the liquid flavoring in the woody ring granules, and packaging the product following such absorption of the liquid flavoring by said woody ring granules.

15. In a method of processing and packaging for long storage a concentrated flavor premix of the character described, the steps of agitating a mixture of granules consisting essentially of woody ring having a moisture content of less that about 6% in a mixer, slowly adding a quantity of liquid flavoring to the woody ring granules during the agitation thereof until the proportions of liquid flavoring are about 20 to 35% by weight of the woody ring, continuing the agitation of the woody ring granules to attain a capillary absorption of the liquid flavoring therein and until a temperature rise of about 10° F. results in the agitated mixture, and compressing the mixture into a container to within about 80% of its initial volume.

16. A flavor premix for animal feeds, consisting essentially of the woody ring constituent of a corncob and a liquid flavoring in absorptive admixture therewith.

17. The premix of claim 16 in which said liquid flavoring comprises at least 20% by weight of the woody ring and is taken from the class consisting of essential oils, terpeneless oils, infused oils, oleoresins, solid extracts, aromatic chemicals, balsams, powdered extracts, animal derivatives, powdered dry spices, perfume oils, fixed oils, solvents, emulsifying agents, fractionated vegetable agents and tinctures.

References Cited in the file of this patent

UNITED STATES PATENTS

| 2,665,987 | Baier | Jan. 12, 1954 |
| 2,733,145 | Karr et al. | Jan. 31, 1956 |

FOREIGN PATENTS

| 4,505 | Great Britain | 1875 |